Feb. 14, 1956   J. F. LENNEY ET AL   2,734,875
CATALASE INHIBITORS AS RETARDERS IN THE DECOMPOSITION
OF HYDROGEN PEROXIDE WITH CATALASE
Filed July 6, 1950
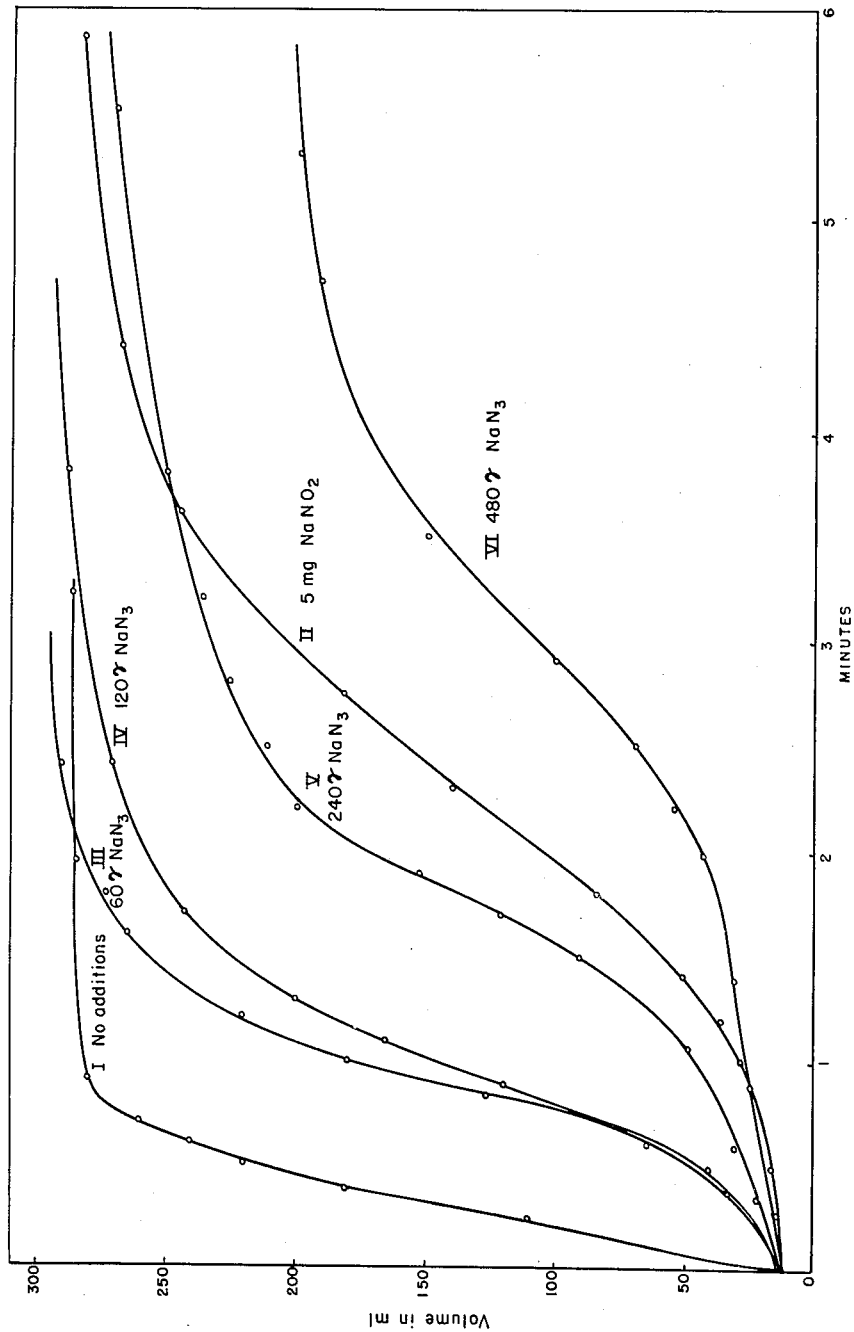
INVENTORS
James F. Lenney
Sutton Redfern
Robert F. Light
BY John S. Lachowicz
Attorney

United States Patent Office 2,734,875
Patented Feb. 14, 1956

2,734,875

CATALASE INHIBITORS AS RETARDERS IN THE DECOMPOSITION OF HYDROGEN PEROXIDE WITH CATALASE

James F. Lenney, Douglaston, Sutton Redfern, New York, and Robert F. Light, Mount Vernon, N. Y., assignors to Standard Brands Incorporated, New York, N. Y., a corporation of Delaware Application July 6, 1950, Serial No. 172,352

4 Claims. (Cl. 260—2.5)

This invention relates to a method of inhibiting the action of the enzyme catalase on hydrogen peroxide, particularly in the manufacture of sponge rubber. The invention also relates to compositions comprising catalase and catalase inhibitors.

It is known that sponge rubber can be manufactured by mixing hydrogen peroxide with rubber latex and decomposing the hydrogen peroxide with catalase to form a foam consisting of minute bubbles of oxygen uniformly dispersed throughout the latex. However, the major part of the gas evolution in this reaction takes place in 30 to 90 seconds, which is too fast to permit handling large sized sponge rubber products.

The object of the present invention is to delay the reaction sufficiently to permit thorough mixing of relatively large quantities of the reactants and pouring into large moulds.

There are many references in biochemical literature to compounds which inhibit the action of catalase on hydrogen peroxide. The studies with these compounds were carried out at very low hydrogen peroxide concentrations and at a low temperature, usually at 0.01 molar concentration and 0° C. This low concentration and temperature are employed because of the fact that hydrogen peroxide has the ability to destroy catalase.

In the present invention the catalase and the catalase inhibitor must work at room temperature or higher and at a peroxide concentration of one per cent or more. Under such conditions many of the classical catalase inhibitors such as phenol, phenylhydrazine and fluoride have no effect on the reaction. Other well known inhibitors such as sodium formate and silver nitrate decrease the reaction rate during the entire course of the decomposition and prevent the reaction from going to completion. This type of inhibitor is not suited for the production of sponge rubber because it is desirable to decompose all of the hydrogen peroxide.

We have found that there are many catalase inhibitors which are effective at relatively high hydrogen peroxide concentrations, and at room or higher temperatures, to produce an initial lag period followed by a fairly rapid gas evolution and which allow the reaction to go to completion. These compounds almost completely inhibit the catalytic decomposition of hydrogen peroxide during the initial phase of the reaction but a concentration of nascent oxygen is built up during this period to a point where the inhibitor is inactivated and then the catalase can complete the reaction.

This lag phase type of inhibition has never been reported before, to the best of our knowledge. The lag phase seems to be a peculiarity displayed by certain inhibitors at relatively high concentrations of hydrogen peroxide only. Catalase inhibitors, when employed at low hydrogen peroxide concentrations, cause an overall lowering of the reaction rate, with no evidence of a lag phase. Since the studies of catalase inhibition reported in the biochemical literature were conducted at very low peroxide concentration, the lag phase type of inhibition was not obtained.

The length of the lag period will depend to some extent upon the amount of inhibitor used. Generally speaking, a lag period of one minute can be provided which will give the sponge rubber manufacturer sufficient time for mixing the catalase into the latex and pouring the mixture into a mold before vigorous expansion commences. Since the catalase itself is inactivated by hydrogen peroxide, the concentration of catalase should be adjusted so that there is a sufficient amount present to complete the decomposition of the peroxide. The reaction can generally be completed in about five to six minutes.

According to the invention, any catalase inhibitor may be used which is not inactivated by relatively concentrated hydrogen peroxide, for instance, at concentrations of 1% and above, but which is inactivated by nascent oxygen. The following are examples of compounds which have been found suitable:

| | |
|---|---|
| Alkali metal azides | $NaN_3$ |
| Hydroxylamine salts | $(NH_2OH)_2 \cdot H_2SO_4$ |
| Thiocyanates | $KSCN$ |
| Salts of ethylene diamine tetraacetic acid | $[CH_2]_2N_2[CH_2COONa]_4$ |
| Alkali metal mono-sulfides | $Na_2S$ |
| Diamine sulfate | $NH_2 \cdot NH_2 \cdot H_2SO_4$ |
| Alkali metal cyanides | $NaCN$ |
| Alkali metal nitrites | $NaNO_2$ |
| Alkali metal iodoacetates | $CI_3COONa$ |
| Cysteine | $SHCH_2CHNH_2COOH$ |
| Cupric sulfate | $CuSO_4$ |
| Bismuth nitrate | $Bi[NO_3]_3$ |

There are a number of facts which indicate that in this reaction the catalase inhibitors are rendered ineffective by nascent oxygen. If hydroxylamine sulfate or sodium cyanide is subjected to the action of nascent oxygen produced by the decomposition of peroxide with catalase, they no longer have the ability to inhibit catalase. Sodium cyanate, the oxidation product of sodium cyanide, has no inhibiting ability.

The hydrogen peroxide does not itself appear to be responsible for the inactivation of the inhibitors as shown, for example, by the fact that they are effective even though added to the hydrogen peroxide solution ten minutes before the catalase is added. However, if catalase is added first and the reaction is started, then the addition of the usual amount of inhibitor will no longer cause any inhibition, apparently because after the reaction is under way there is sufficient nascent oxygen present to immediately inactivate the inhibitor.

The inhibitor may stand in solution with the catalase for several days without any change in the lag phase reaction curve, thus indicating that the enzyme itself does not destroy the inhibitor. Also there appears to be no change in the catalase itself during the reaction. If an excess of catalase is employed, enough will survive the reaction so that the enzyme can be used to catalyse a second reaction and displays normal reaction curves both in the presence and in the absence of the inhibitor.

The catalase may be derived from yeast, liver, blood or any other source. Yeast is a particularly economical source. Compressed or dry yeast may be added to the reaction mixture in comminuted form but preferably in an aqueous suspension which also contains the inhibitor. It is particularly advantageous to provide a dry powdered mixture of catalase-containing dry yeast and the inhibitor which is stable and can be kept indefinitely.

The effect of the inhibitors is shown in the following examples:

*Example 1.*—A mixture was made up of the following:

2.5 ml. 30% $H_2O_2$
5.0 ml. borax buffer
1.0 ml. 4% Triton 770

This mixture was placed in a graduated cylinder and then 1.5 ml. of an aqueous suspension of 75 mg. of catalase-containing dry yeast were stirred in. The initial volume was 10 ml., the pH 9.0 and the hydrogen peroxide concentration 7.5%. There was more than a 25-fold increase in volume within one minute after the yeast was added as shown by curve I in the attached drawing.

*Example 2.*—When 5 milligrams of sodium nitrite were included in the yeast suspension of Example 1, the reaction was inhibited as shown in curve II.

*Example 3.*—Example 1 was repeated except that varying amounts of sodium azide were added to the yeast suspension with the results shown by curves III to VI. Even with 60 micrograms there is a decided initial lag in the reaction while with 480 micrograms the reaction is prevented from going to completion.

The same results are obtained by substituting for the borax buffer solution in the foregoing examples natural rubber latex or synthetic rubber latices or any other material capable of being foamed. The pH of the reaction mixture should be between 4 and 11 and, if necessary, may be adjusted by the addition of borax or other buffer. Other foaming agents may be used in place of the Triton or they may be omitted when not necessary to produce or stabilize the foam.

We claim:

1. A method of retarding the reaction of catalase with hydrogen peroxide which comprises incorporating an alkali metal azide in a mixture comprising catalase and hydrogen peroxide of at least 1% strength.

2. In a process for the production of sponge rubber involving the reaction of hydrogen peroxide and catalase in an aqueous rubber dispersion, the step which comprises commingling catalase and an alkali metal azide with a mixture of hydrogen peroxide and an aqueous rubber dispersion, the concentration of hydrogen peroxide being at least 1%, the concentration of the inhibitor being sufficient to substantially inhibit the reaction initially but insufficient to prevent it from going to substantial completion and the concentration of the catalase being sufficient for substantially complete decomposition of the peroxide.

3. A process as claimed in claim 2 wherein the concentration of alkali metal azides is sufficient to substantially inhibit the reaction for about the first minute but insufficient to prevent the reaction from going to substantial completion.

4. A process as claimed in claim 3 wherein the alkali metal azide is sodium azide.

References Cited in the file of this patent

UNITED STATES PATENTS

| | | |
|---|---|---|
| 2,138,081 | Wolf | Nov. 29, 1938 |
| 2,305,714 | Kell | Dec. 22, 1942 |
| 2,432,353 | Talalay | Dec. 9, 1947 |
| 2,540,040 | Baker | Jan. 30, 1951 |
| 2,617,840 | Eckert | Nov. 11, 1952 |

FOREIGN PATENTS

| | | |
|---|---|---|
| 324,651 | Great Britain | Jan. 20, 1930 |

OTHER REFERENCES

Spiegelman et al.: Archives of Biochemistry, 1948, vol. 18, pages 409–436; pages 409 to 412 are relied upon.